(12) United States Patent
Yabuki

(10) Patent No.: US 6,370,916 B1
(45) Date of Patent: Apr. 16, 2002

(54) FLARE MANUFACTURING METHOD

(75) Inventor: Tatsuhiro Yabuki, Bizen (JP)

(73) Assignee: Matsushita Electronics Corporation (JP)

( * ) Notice: Subject to any disclaimer, the term of this patent is extended or adjusted under 35 U.S.C. 154(b) by 0 days.

(21) Appl. No.: 09/488,518

(22) Filed: Jan. 21, 2000

(30) Foreign Application Priority Data

Jan. 25, 1999 (JP) ............................................. 11-015036

(51) Int. Cl.⁷ ............................................... C03B 23/04
(52) U.S. Cl. ............................. 65/109; 65/102; 65/108; 264/311; 264/312
(58) Field of Search ........................ 65/109, 108, 102; 264/311, 312

(56) References Cited

U.S. PATENT DOCUMENTS

| 3,005,122 A | 10/1961 | Coleman et al. |
| 3,362,435 A | * 1/1968 | Meyer |
| 3,839,003 A | * 10/1974 | Dockerty et al. |
| 4,052,189 A | 10/1977 | Dockerty et al. ............. 65/319 |

FOREIGN PATENT DOCUMENTS

| DE | 2 150 222 | 4/1972 |
| EP | 0 583 842 | 2/1994 |
| JP | 47-11744 | 5/1972 |
| JP | 59-209245 A | 11/1984 |
| JP | 61-074238 A | 4/1986 |
| JP | 61-176032 A | 8/1986 |

OTHER PUBLICATIONS

Patent Abstracts of Japan, Pub.No. 60009031, Jan. 18, 1985.
Patent Abstracts of Japan, Pub.No. 61176032, Aug. 7, 1986.
Patent Abstracts of Japan, Pub.No. 05054799, Mar. 5, 1993.
Patent Abstracts of Japan, Pub.No. 63170827, Jul. 14, 1988.

* cited by examiner

Primary Examiner—Christopher A. Fiorilla
(74) Attorney, Agent, or Firm—Parkhurst & Wendel, L.L.P

(57) ABSTRACT

It is an object of the present invention to reduce variations in dimensional accuracy such as the outer-diameter accuracy and roundness of a flare shape and the concentricity between the bulb portion and the flare portion. According to the present invention, a lower mold (1) formed of a metallic material and forming a recess flare shape (1a) that is subjected to surface treatment forms a flare shape (21b) almost identical to the flare shape (1a) by means of the rotational motion of a rotating head portion (2). An upper mold (10) is fitted in the lower mold (1) to form a flare-shaped gap portion (13), into which glass is forced to form a flare shape (22).

3 Claims, 10 Drawing Sheets

FLARE MANUFACTURING METHOD

FIELD OF THE INVENTION

The present invention relates to a flare manufacturing method and flare manufacturing apparatus for bulbs such as incandescent, fluorescent lamps or the like.

BACKGROUND OF THE INVENTION

A configuration of a flare manufacturing machine for use in a flare manufacturing method for conventional bulbs, for example, incandescent and fluorescent lamps will be described with reference to FIG. 9.

Rotating heads 52 each including a chuck mechanism 52a for chucking an outer peripheral portion of a glass bulb 51 are mounted on an index plate 53 using a number of head screws 52b. The rotating head 52 can be rotated by a drive motor 54 in an arrow I direction. In addition, the drive motor 54 has a mechanism for intermittently feeding the index plate 53 depending on the rotation speed of the rotating heads 52, and rotates in an arrow J direction. A base 55 has a glass bulb positioning jaw 57 that is operated by an air cylinder 56 to chuck a tip portion of the glass bulb 51 and that can be moved in arrow K and L directions. A glass bulb positioning base 58 is operated by an air cylinder 59 for movement in arrow M and N directions. A molding plate 61, which forms a flare shape when rotated by a molding motor 60, is attached to the molding motor 60 via a molding shaft 61a. Besides, the molding plate 61 is attached to the molding motor 60 for rotation in an arrow O direction and for movement by a molding cylinder 62 in arrow P and Q directions. Reference numeral 63 denotes a burner for heating a peripheral portion of the glass bulb 51. In addition, the base 55 has a burner 63 attached to the base 55 for heating the glass bulb 51 after the flare shape has been formed, as also shown in FIG. 10, and a bulb cutter 64 also attached to the base 55 for cutting the glass bulb 51 into predetermined sizes.

A process for manufacturing a flare using a conventional bulb flare manufacturing machine of the above described configuration will be described.

First, in a first position, an automatic insertion machine (not shown) inserts the glass bulb 51 into the rotating head, and the glass bulb positioning jaw 57 chucks the glass bulb 51 and moves it in the arrow K direction. Then, a glass bulb positioning base 58 moves in an arrow N direction and then stops at a predetermined position to abut on the tip portion of the glass bulb 51 in order to establish a predetermined length size. Then, the chuck mechanism 52a chucks the outer peripheral portion of the glass bulb 51, and the glass bulb positioning jaw 57 stops chucking and then moves in the arrow L direction. The glass bulb positioning base 58 also moves in an arrow M direction to leave the glass bulb 51. Next, upon detecting the insertion of the glass bulb 51, the rotating head 52 starts rotating in the arrow I direction.

In a second position, the burner 63 gradually heats the peripheral portion of the tip of the glass bulb 51 until the glass bulb reaches its softening point.

In a third position, the molding plate 61 is moved in the arrow Q direction and is inserted slowly into the inside of the tip portion of the glass bulb 51. Then, the rotating force of the molding plate 61 causes the glass bulb 51 to gradually expand starting with its tip portion along the molding plate 61. The molding plate 61 is further inserted and then stopped at a predetermined position. Then, the glass bulb 51 is deformed into a flare shape entirely corresponding to the shape of the molding plate 61, and the molding plate 61 moves in the arrow P direction.

Subsequently, the burner 63 heats the glass bulb 51 in a fourth position, and the bulb cutter 64 cuts the glass bulb 51 in a fifth position to complete flare manufacturing.

According to such a conventional flare manufacturing method for bulbs, the outer peripheral portion of the glass bulb is chucked to mold the bulb into a flare shape by defining this shape from inside of the glass bulb. The glass bulb, however, is not externally molded during the formation of the flare shape, resulting in large variations in dimensional accuracy such as the outer-diameter accuracy and roundness of the flare and the concentricity between the bulb portion and the flare portion.

DISCLOSURE OF THE INVENTION

It is an object of the present invention to provide a flare manufacturing method and apparatus for bulbs which can obtain a flare with a stable dimensional accuracy.

A flare manufacturing method for bulbs according to the present invention comprises: a cylindrical bulb; heating means for heating and melting the bulb; a first mold having a recess formed into a flare shape and rotatively moved by rotation drive means; and a second mold having a projection fitted in the first mold to form a flare-shaped gap, and wherein the method comprises the steps of: inserting the bulb into the first mold for rotational motion; using the heating means to mold the bulb into a flare shape almost identical to the flare-shaped gap; and forming the flare shape using the second mold.

This configuration can stabilize the dimensional accuracy of the flare shape.

In addition, in the flare manufacturing method for bulbs according to the present invention, when inserting the bulb into the first mold to rotatively move it by means of the rotation drive means and then using the heating means to mold the bulb into the flare shape almost identical to the flare-shaped gap, the almost identical flare shape is formed using flare formation support means having a shape almost identical to the shape of the second mold before forming the flare shape using the second mold.

According to this configuration, when the bulb has failed to expand into the almost identical flare shape despite the heating of the bulb by the heating means and the subsequent rotation of the first mold by means of the drive means, the flare formation support means enables the expansion to improve productivity.

Furthermore, in the flare manufacturing method for bulbs according to the present invention, at least one of the first and second molds has heat insulating means for maintaining temperature.

This configuration can reduce variations in mold temperature to further stabilize the dimensional accuracy of the flare shape.

A flare manufacturing apparatus for bulbs according to the present invention comprises: a first mold having a recess formed into a flare shape and rotatively moved by rotation drive means; a second mold having a projection fitted in the first mold to form a flare-shaped gap; and heating means for heating and melting a cylindrical bulb held by the first mold.

This configuration improves the dimensional accuracy of the flare shape.

In addition, in the flare manufacturing apparatus for bulbs according to the present invention, flare formation support means, which forms a flare shape almost identical to a projection of the second mold when rotated, is mounted on an index plate with the first mold.

According to this configuration, when the bulb has failed to expand into the flare shape despite the rotation of the first mold, the flare formation support means enables the expansion to improve productivity.

Furthermore, the flare manufacturing apparatus for bulbs according to the present invention has a shape recognition sensor for checking whether the glass bulb has a flare shape almost identical to that of the mold.

This configuration can check whether or not the bulb has failed to expand into the flare shape despite the rotation of the first mold.

In addition, at least one of the first and second molds has heat insulating means for maintaining temperature.

This configuration can reduce variations in mold temperature to further stabilize the dimensional accuracy of the flare shape.

As described above, by expanding the bore of the glass bulb based on the rotational force of the lower mold to form the general flare shape and then fitting the lower mold on the upper mold to form the complete flare shape, the present invention can provide a flare manufacturing method and apparatus for bulbs which has an excellent effect of stabilizing dimensional accuracy such as the outer-diameter accuracy and roundness of the flare and the concentricity between the bulb portion and the flare portion.

DESCRIPTION OF THE EMBODIMENTS

Embodiments of the present invention will be described below with reference to the drawings.

Figure 1:
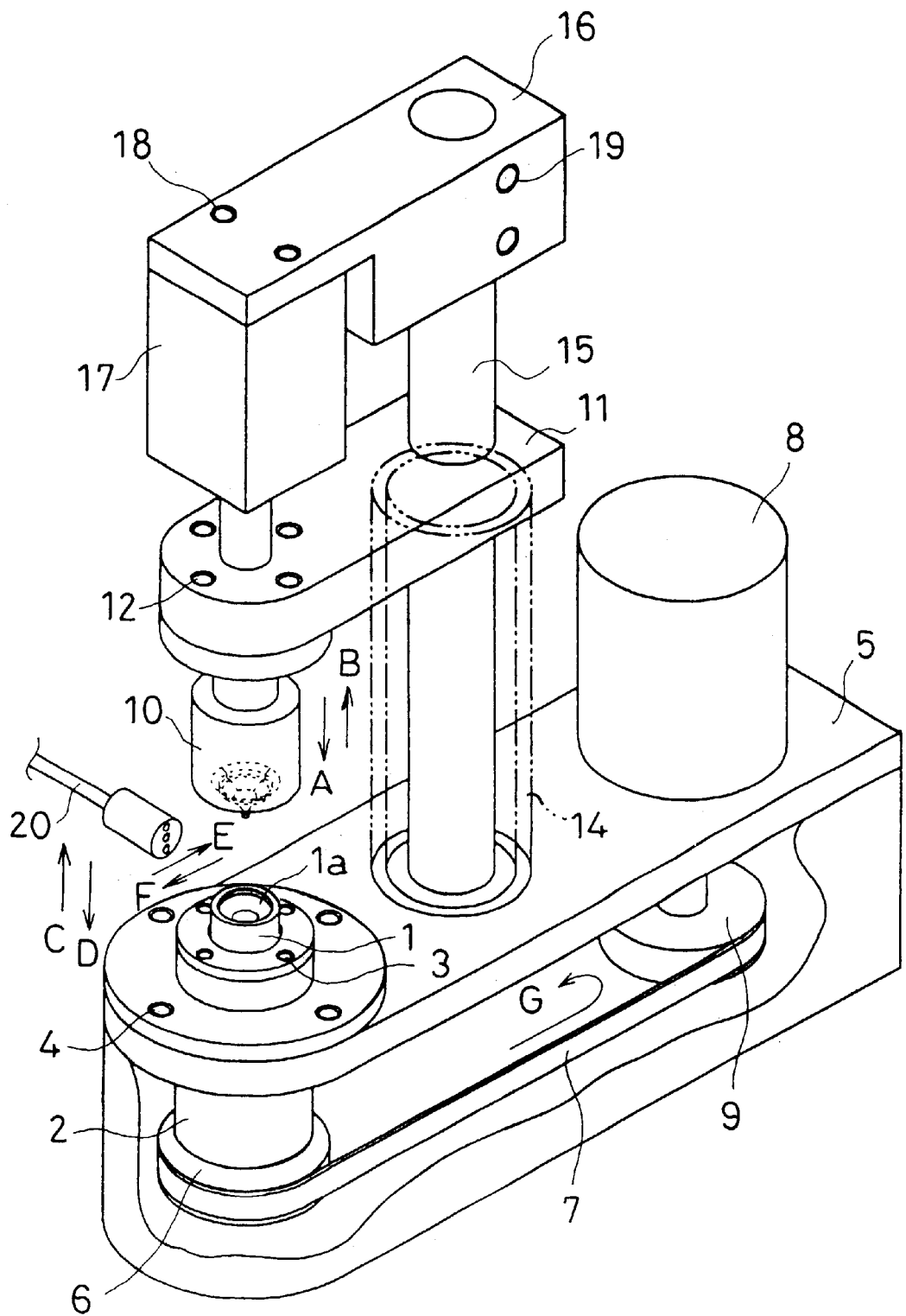
FIG. 1 is a perspective view of essential parts of a flare manufacturing machine in a flare manufacturing method for bulbs according to a first embodiment of the present invention.

First, a configuration of a flare manufacturing machine for use in a flare manufacturing method for incandescent and fluorescent lamps according to a first embodiment of the present invention will be described with reference to FIG. 1.

Figure 2:
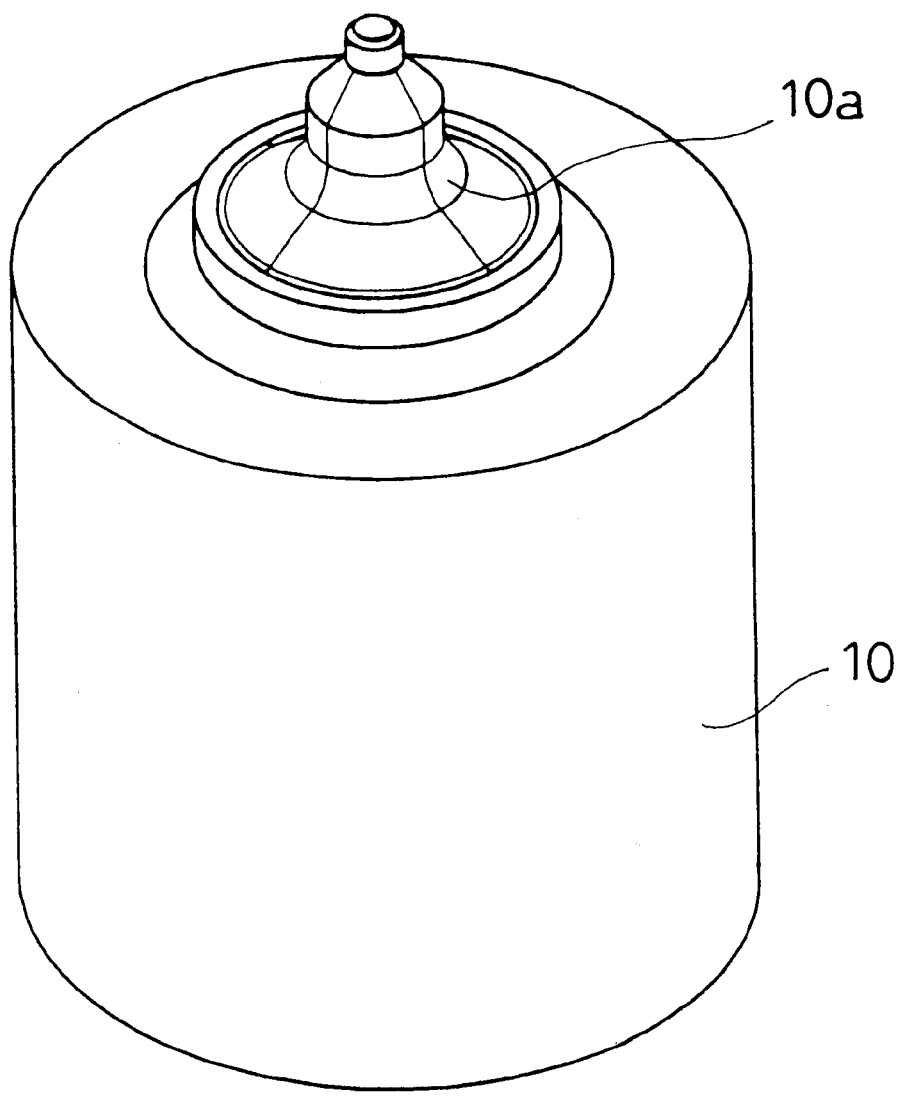
FIG. 2 is a perspective view of essential parts of an upper mold of the flare manufacturing machine.
Figure 3:
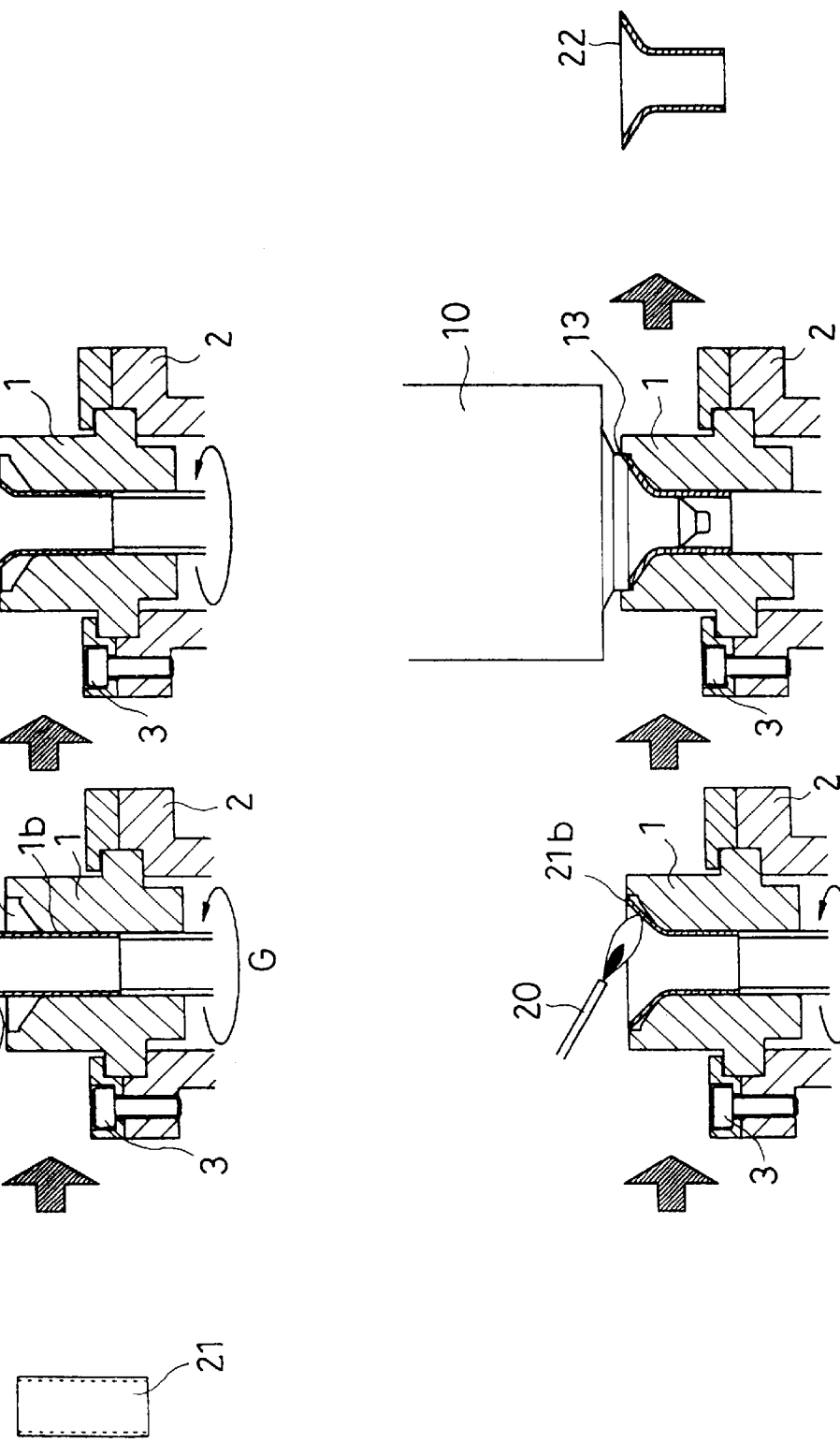
FIG. 3 is a flare manufacturing process diagram showing the flare manufacturing method for bulbs.

A lower mold 1 is (a first mold) formed of a metallic material and forms a recess flare shape 1a that is subjected to surface treatment; the lower mold 1 is attached to a rotating head portion 2 using screws 3. The rotating head portion 2 is fixed to a base 5 using screws 4 and connected to a motor pulley 9 of a drive motor 8 via a rotating head pulley 6 by means of a drive belt 7 for rotational motion. An upper mold (a second mold) 10 is produced using a metallic material similar to that of the lower mold 1 and is fixed to an upper arm 11 using screws 12. The upper mold 10 has a projecting flare shape 10a formed thereon so as to form a flare-shaped gap 13 as shown in FIGS. 2 and 3 when fitted in the lower mold 1. A projecting flare shape 10a is subjected to surface treatment. The upper arm 11 is held on the base 5 by means of a spring 14. In addition, a main shaft 15 has an air cylinder 17 fixed thereto via an air cylinder base 16 using screws 18, and an air cylinder base 16 is fixed to the main shaft 15 using screws 19. The air cylinder 17 can move the upper mold 10 in arrow A and B directions. A burner (heating means) 20 can be moved in arrow C, D, E, and F directions by means of a burner motor (not shown).

A flare manufacturing process carried out by the flare manufacturing machine for incandescent and fluorescent lamps constructed as described above will be described below.

Figure 4:
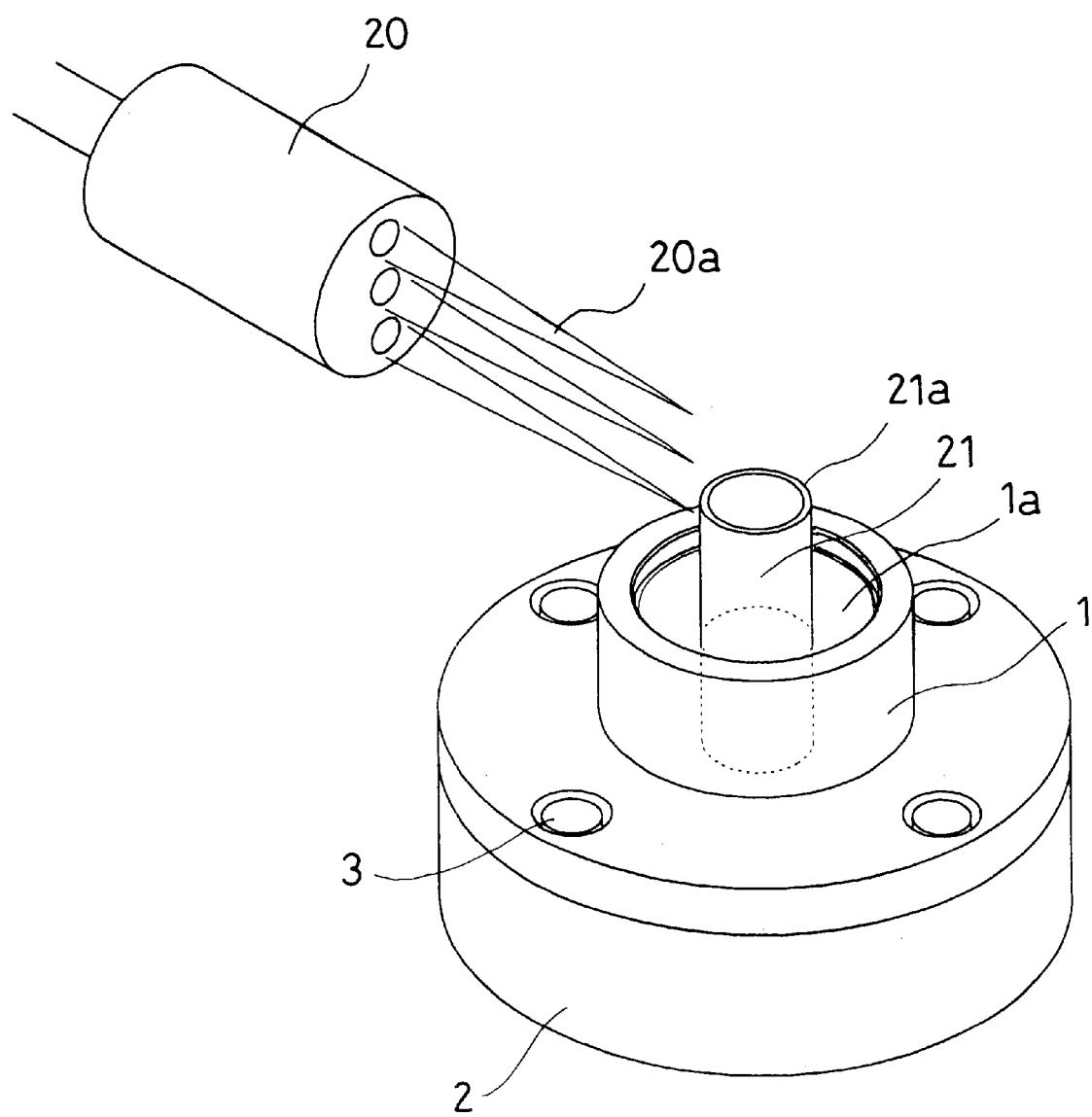
FIG. 4 is a perspective view of essential parts of the flare manufacturing process during glass bulb melting.

First, a cylindrical glass bulb 21 of a fixed size obtained by cutting a certain material is inserted into a bulb insertion hole 1b in the lower mold 1 using an automatic insertion machine (not shown). Then, a sensor detects the insertion of the glass bulb 21 to issue a rotation signal to the drive motor 8. The drive motor 8 is then rotated to start rotating the lower mold 1 in the arrow G direction. Next, the burner 20 is used to gradually heat a tip portion 21a of the glass bulb 21 as shown in FIG. 4. The glass bulb 21 reaches its softening point, and the rotational force of the lower mold 1 causes the tip portion 21a of the glass bulb 21 to gradually expand. Further, as the burner 20 is moved in the arrow D direction to extend the melting range of the glass bulb 21, the bulb 21 is gradually deformed into a flare shape 21b almost identical to that of the lower mold.

Next, with the softening point of the glass bulb 21 maintained, the burner 20 is moved in the arrow F direction from the glass bulb 21 to remove flares 20a. The air cylinder 17 is used to move the upper mold 10 in the arrow A direction against the force of the spring 14. Then, upon detecting a signal indicating the movement of the air cylinder 17, the drive motor 8 and thus the lower mold 1 stops rotations. As the air cylinder 17 further moves the upper mold 10 in the arrow A direction, the upper mold 10 comes in contact with the tip portion 21a of the glass bulb 21 to start forcing the glass into a flare-shaped gap portion 13 between the lower mold 1 and the upper mold 10. Then, when the upper mold 10 reaches a position at which it is completely fitted in the lower mold 1, the glass is forced into the flare-shaped gap 13 to form a flare shape 22.

Subsequently, as the air cylinder 17 moves in the arrow B direction, the upper mold 10 moves in the arrow B direction due to the force of the spring 14. A flare removal device (not shown) removes the flare, and the burner 20 moves in the arrow F direction to a predetermined position. Thus, flare manufacturing is completed.

As described above, the flare manufacturing method for incandescent and fluorescent lamps according to a first embodiment of the present invention molds the glass bulb 21 into the general flare shape 21b using the rotational force of the lower mold 1 and then forms this glass bulb 21, which now has the general flare shape 21b, into the complete flare shape 22 using the flare-shaped gap 13 between the lower mold 1 and the upper mold 10. Thus, the upper and lower molds can be used to define the flare shape 22, thereby stabilizing the dimensional accuracy of the flare shape 22.

Figure 5:
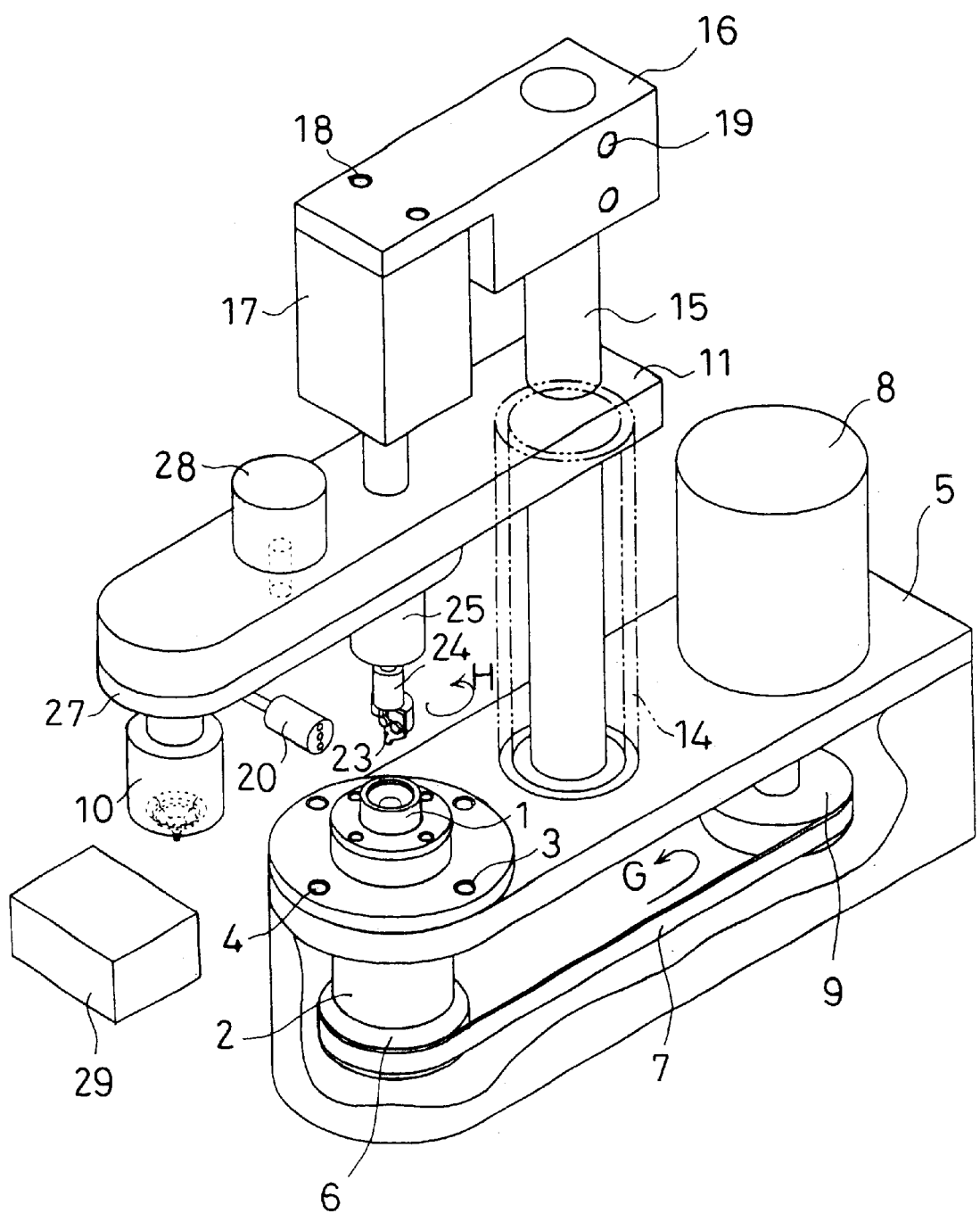
FIG. 5 is a perspective view of essential parts of a flare manufacturing machine in a flare manufacturing method for bulbs according to a second embodiment of the present invention.
Figure 6:
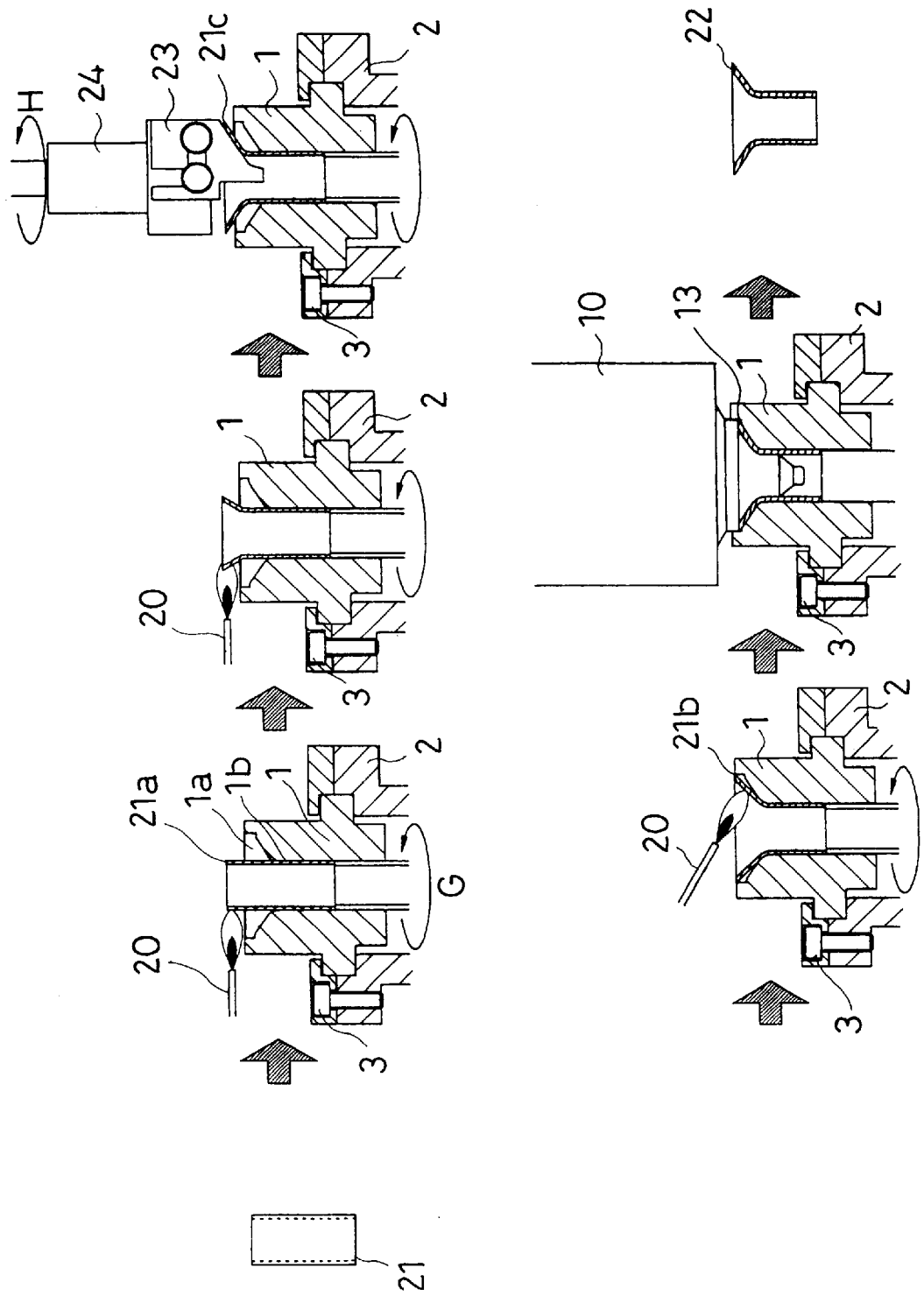
FIG. 6 is a flare manufacturing process diagram showing the flare manufacturing method for bulbs.
Figure 7:
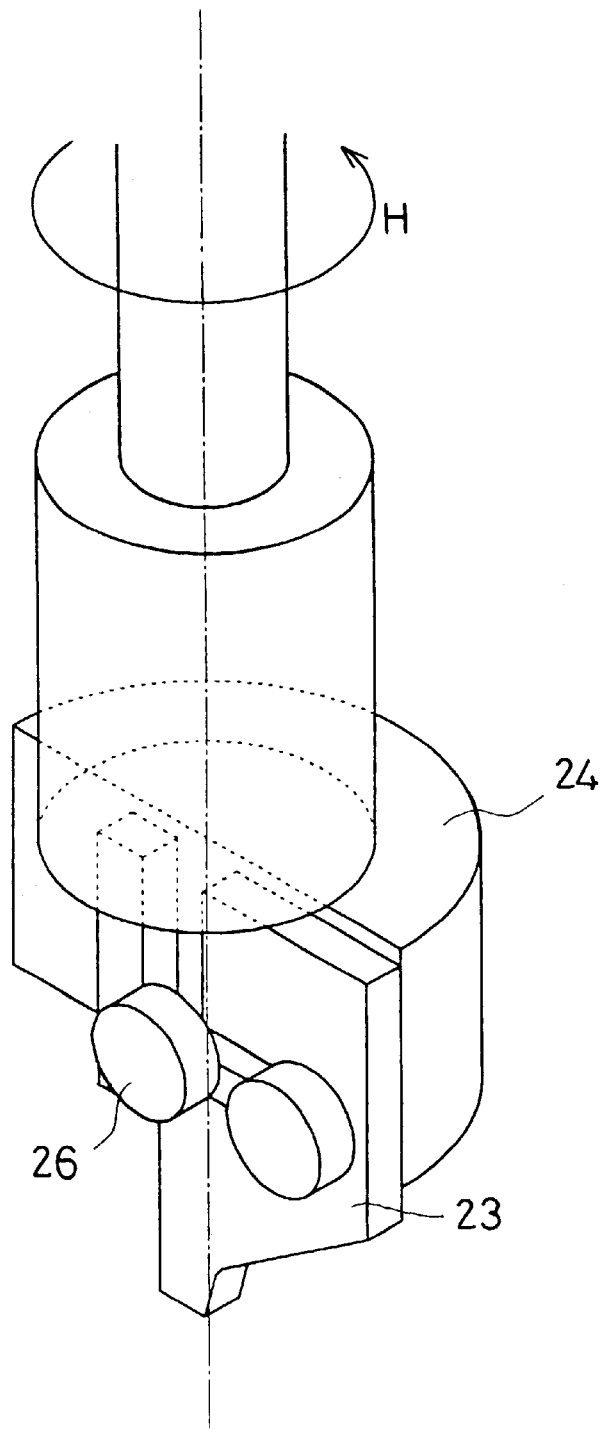
FIG. 7 is a perspective view of essential parts of a rotating plate of the flare manufacturing machine.

Next, a flare manufacturing machine for use in the flare manufacturing method for incandescent and fluorescent lamps according to a second embodiment of the present invention will be described with reference to FIGS. 5 to 7.

A rotating plate (flare formation support means) 23, which exhibits a flare shape almost identical to the projecting flare shape 10a when rotated in an arrow H direction, is attached to a plate driving motor 25 via a plate shaft 24 using screws 26. In addition, the plate driving motor 25 is mounted on the index plate 27 together with the upper mold 10, and the index plate 27 can be operated by an index motor 28 to move the positions of the rotating plate 23 and the upper mold 10 relative to the lower mold 1. The machine also has a shape recognition sensor 29 for checking whether the glass bulb 21 has the almost identical flare shape 21b. With this configuration, when the tip portion 21a of the glass bulb 21 is not sufficiently expanded despite the rotational force of the lower mold 1, the shape recognition sensor 25 recognizes this and sends a rotation signal to the index motor 24. Accordingly, the index plate 23 is rotated to allow the rotating plate 23 to force the almost identical flare shape 21c to be formed. Subsequently, the index plate 27 is rotated to enable the flare shape to be formed using the upper mold 10. As a result, the percent defective is reduced to improve productivity.

Figure 8:
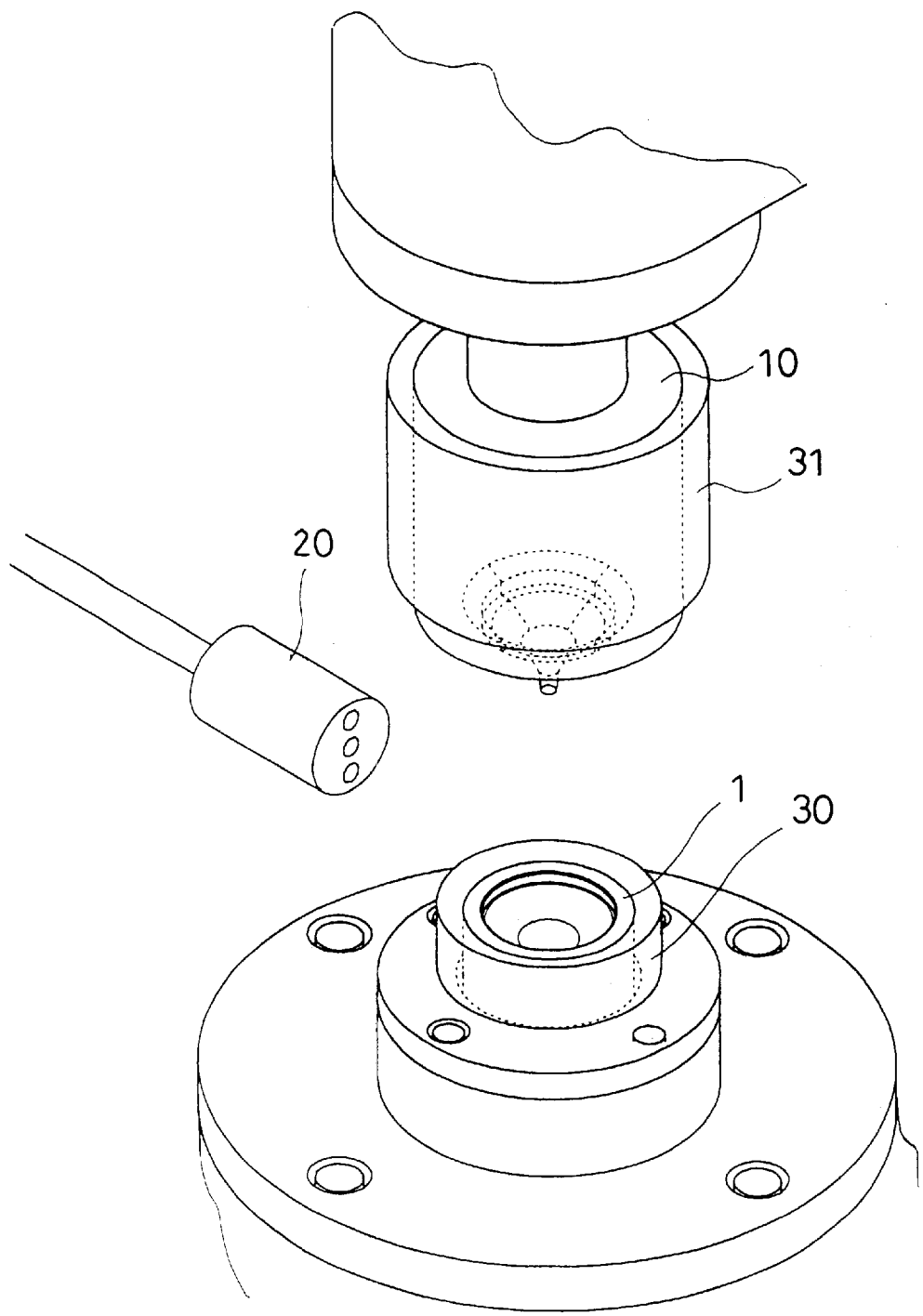
FIG. 8 is a perspective view of essential parts of a flare manufacturing machine in a flare manufacturing method for bulbs according to a third embodiment of the present invention.
Figure 9:
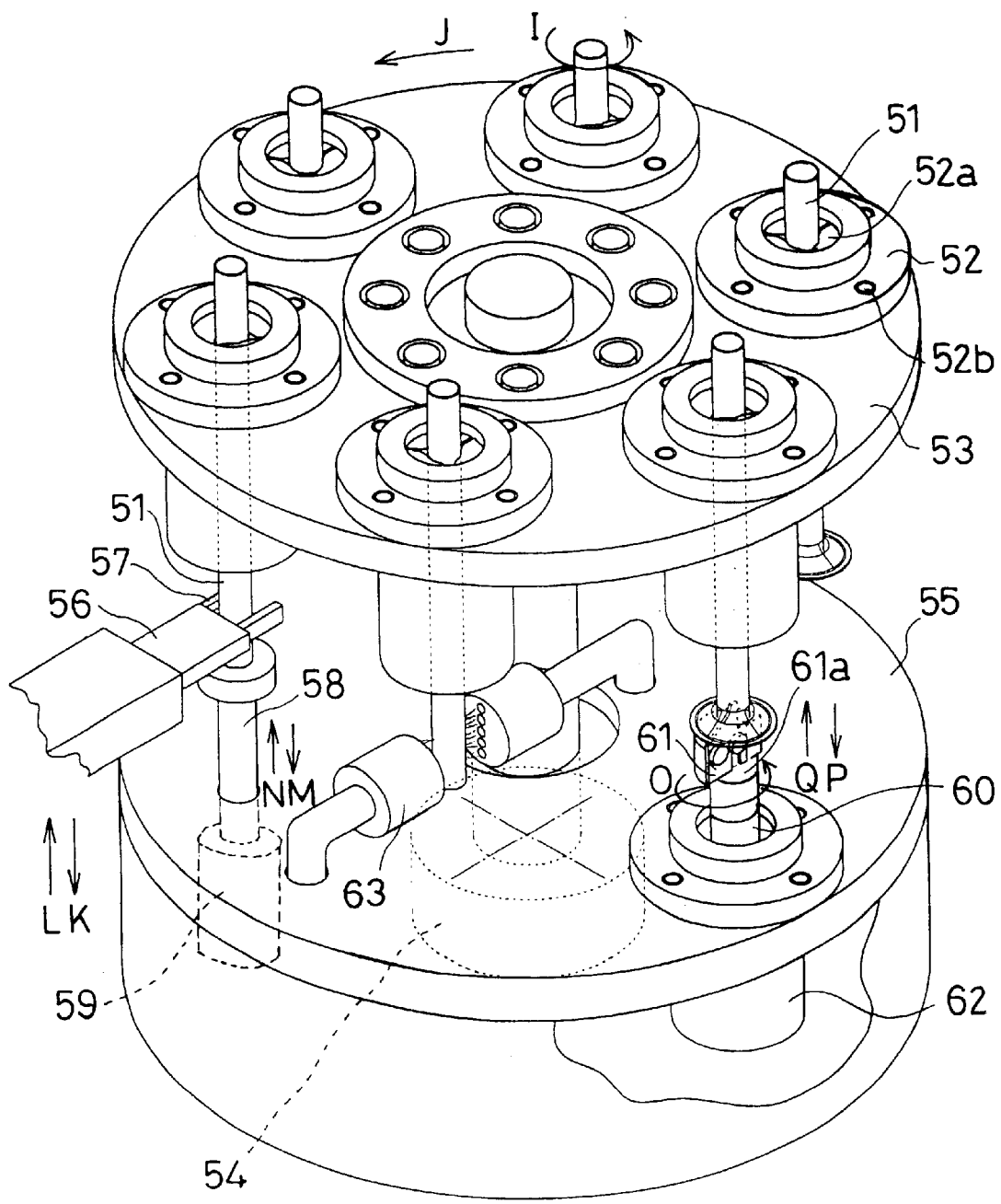
FIG. 9 is a perspective view of essential parts of a flare manufacturing machine in a conventional flare manufacturing method for bulbs.
Figure 10:
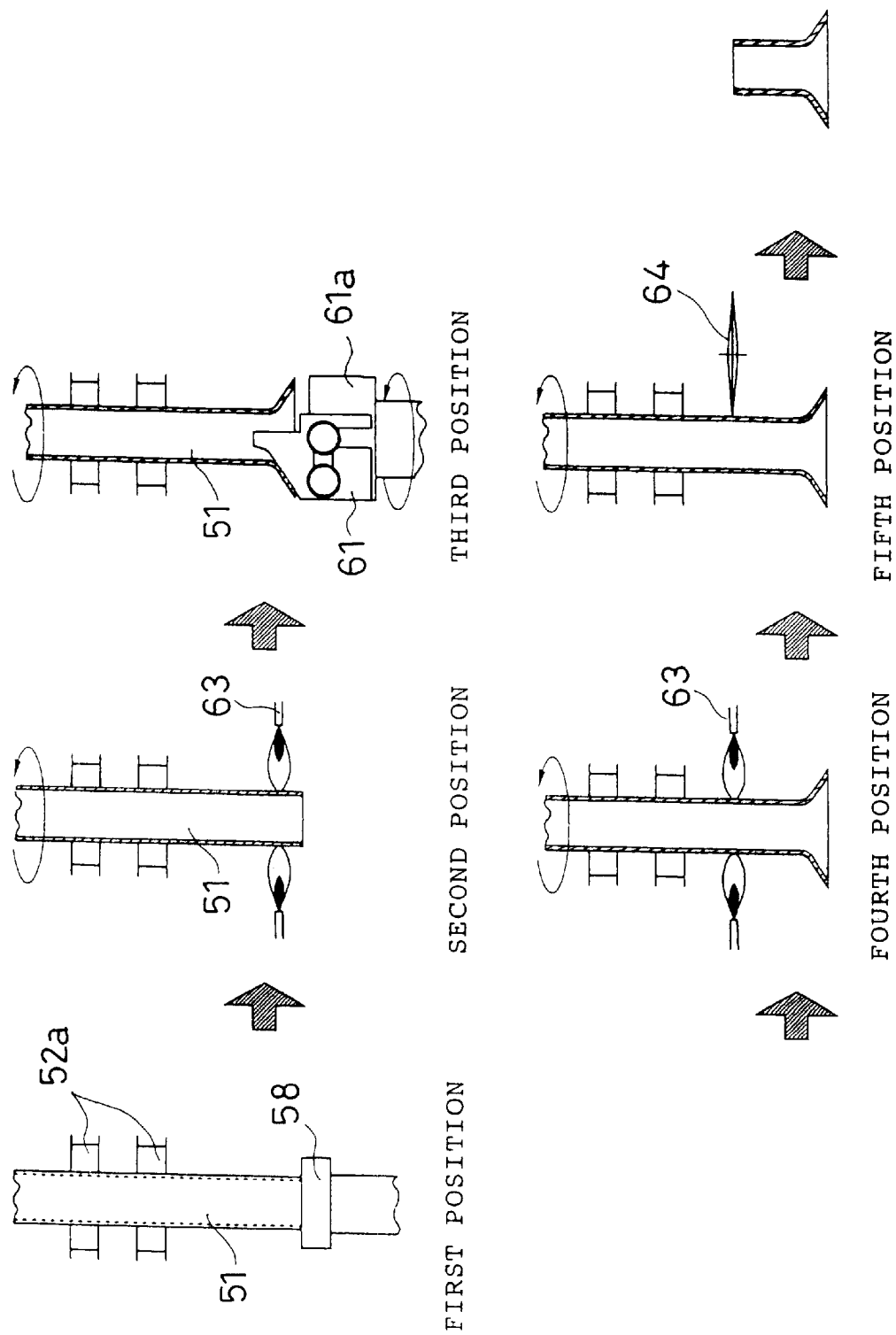
FIG. 10 is a flare manufacturing process diagram showing the flare manufacturing method for bulbs.

FIG. 8 shows a flare manufacturing process for incandescent and fluorescent lamps according to a third embodiment of the present invention. This embodiment differs from the above two embodiments in that the lower mold 1 and the upper mold 10 have heaters (heat insulating means) 30, 31 for controlling temperature. When the lower mold 1 and the upper mold 10 are engaged with each other and the glass is then forced into the flare-shaped gap 13, the contact of the glass with the lower mold 1 and the upper mold 10 reduces the glass temperature below its softening point to solidify the glass into the flare shape 22. Then, this configuration can keep the glass temperature close to the softening point, thereby allowing the glass to be more uniformly filled in the flare-shaped gap 13. Therefore, the dimensional accuracy of the flare shape 22 can further be stabilized.

What is claimed is:

1. A flare manufacturing method for manufacturing a bulb, comprising:

providing a cylindrical bulb;

providing a heating means for heating and melting said bulb;

providing a first mold having a recess formed into a flare shape and rotatively moved by rotation drive mean;

providing a second mold having a projection fitted in said first mold to form a flare-shaped gap;

inserting said bulb into said first mold and rotating said mold and bulb;

heating with said heating means said rotating bulb until said rotating bulb melts and thereby attains an initial flare shape almost identical to said flare-shaped gap;

inserting the bulb having said initial flare shape into said second mold; and molding said bulb in said second mold to attain a final flare shape.

2. The flare manufacturing method according to claim 1, wherein the step of providing a first mold having a recess formed into a flare shape further comprises providing flare formation support means having a shape almost identical to that of the second mold.

3. The flare manufacturing method for bulbs according to claim 1, wherein at least one of the first and second molds has heat insulating means for maintaining temperature.

* * * * *